United States Patent [19]

Wallis

[11] 4,116,006
[45] * Sep. 26, 1978

[54] MODULAR ENGINE ASSEMBLY

[76] Inventor: Marvin E. Wallis, 5535 Longfellow Rd., Santa Barbara, Calif. 93111

[*] Notice: The portion of the term of this patent subsequent to Jun. 7, 1994, has been disclaimed.

[21] Appl. No.: 786,897

[22] Filed: Apr. 12, 1977

Related U.S. Application Data

[60] Continuation-in-part of Ser. No. 652,326, Jan. 26, 1976, Pat. No. 4,027,485, and Ser. No. 650,374, Jan. 19, 1976, said Ser. No. 652,326, is a continuation-in-part of Ser. No. 650,374, , which is a division of Ser. No. 557,746, Mar. 12, 1975, Pat. No. 3,949,556.

[51] Int. Cl.² ............................................. F01B 21/00
[52] U.S. Cl. ...................................... 60/709; 60/718; 74/572
[58] Field of Search ................. 60/698, 706, 709, 711, 60/716, 718; 74/572, 751; 180/54 R, 54 C

[56] References Cited

U.S. PATENT DOCUMENTS

| | | |
|---|---|---|
| 4,027,484 | 6/1977 | Wallis ..................................... 60/718 |
| 4,027,485 | 6/1977 | Wallis ..................................... 60/718 |

*Primary Examiner*—Allen M. Ostrager
*Attorney, Agent, or Firm*—Finnegan, Henderson, Farabow & Garrett

[57] ABSTRACT

Disclosed is a modular engine assembly incorporating a primary engine, an auxiliary engine and a device for storing kinetic energy. The kinetic energy storage device is drivingly coupled to the primary engine. In response to demand for additional power, the auxiliary engine is selectively engaged with the energy storage device by a clutch. The auxiliary engine is thereby turned over and brought up to speed. Once the auxiliary engine is brought up to speed, fuel is supplied whereby the auxiliary engine starts or fires only after it is turning over at a high RPM. Once started, the auxiliary engine drives the transmission through the clutch and primary engine thus increasing available power upon demand.

33 Claims, 10 Drawing Figures

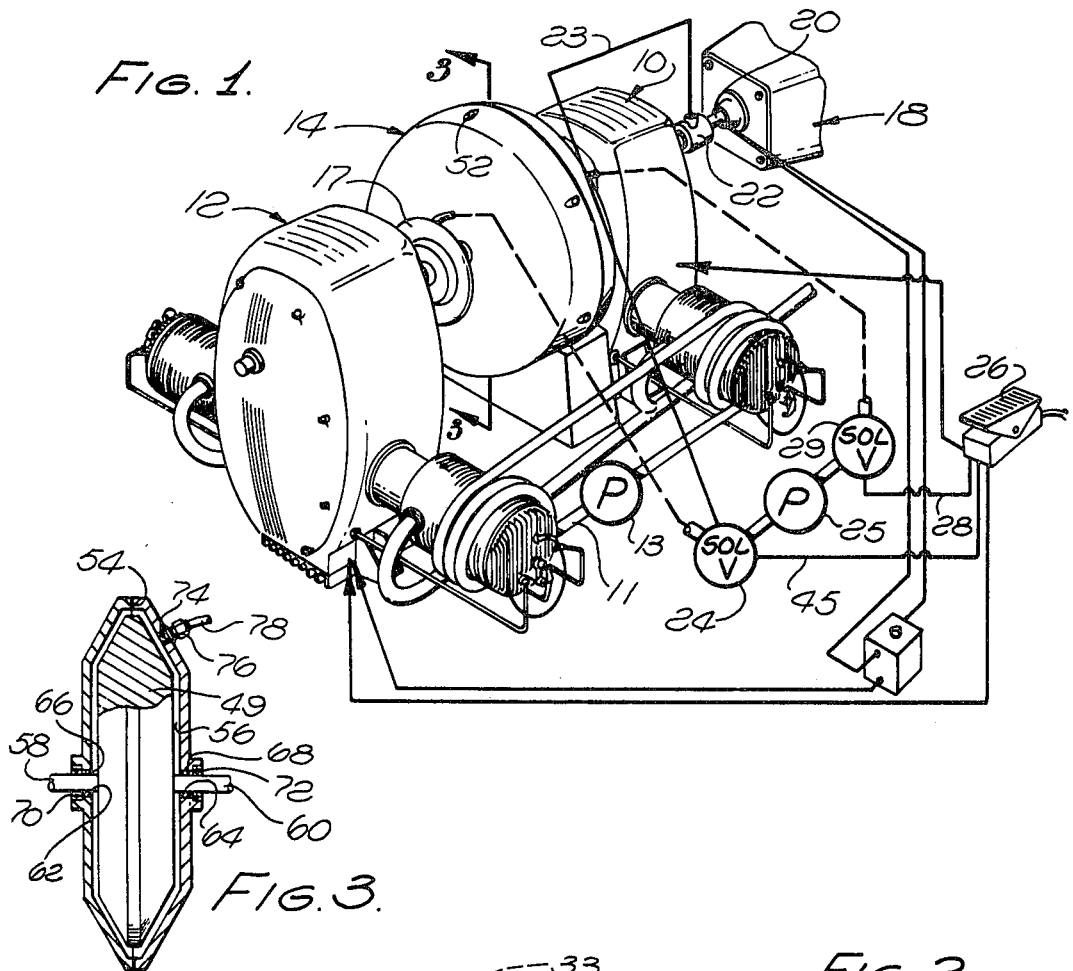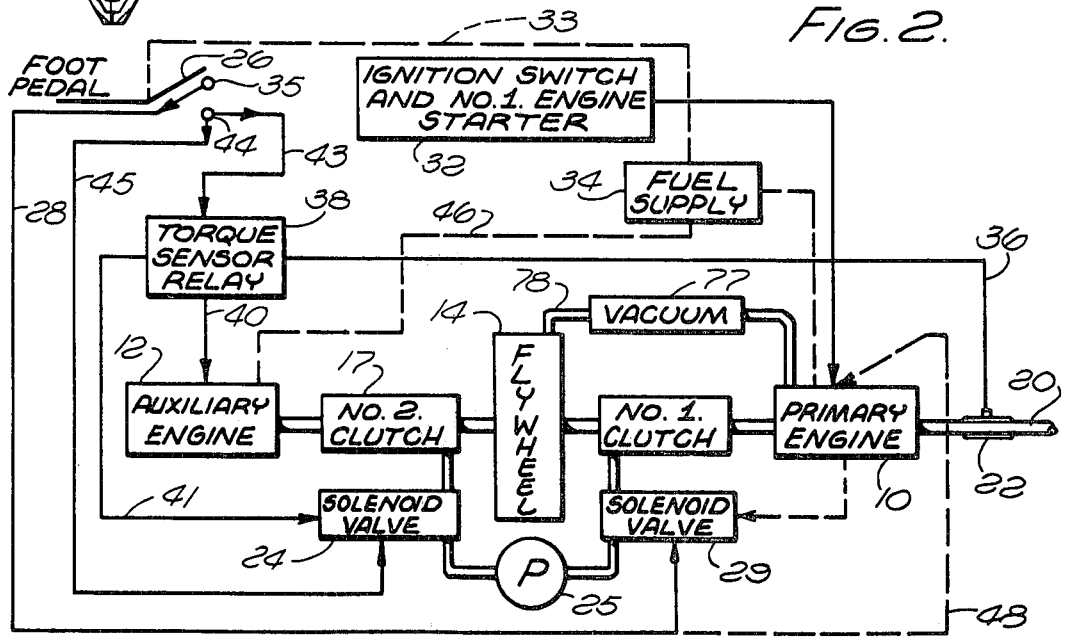

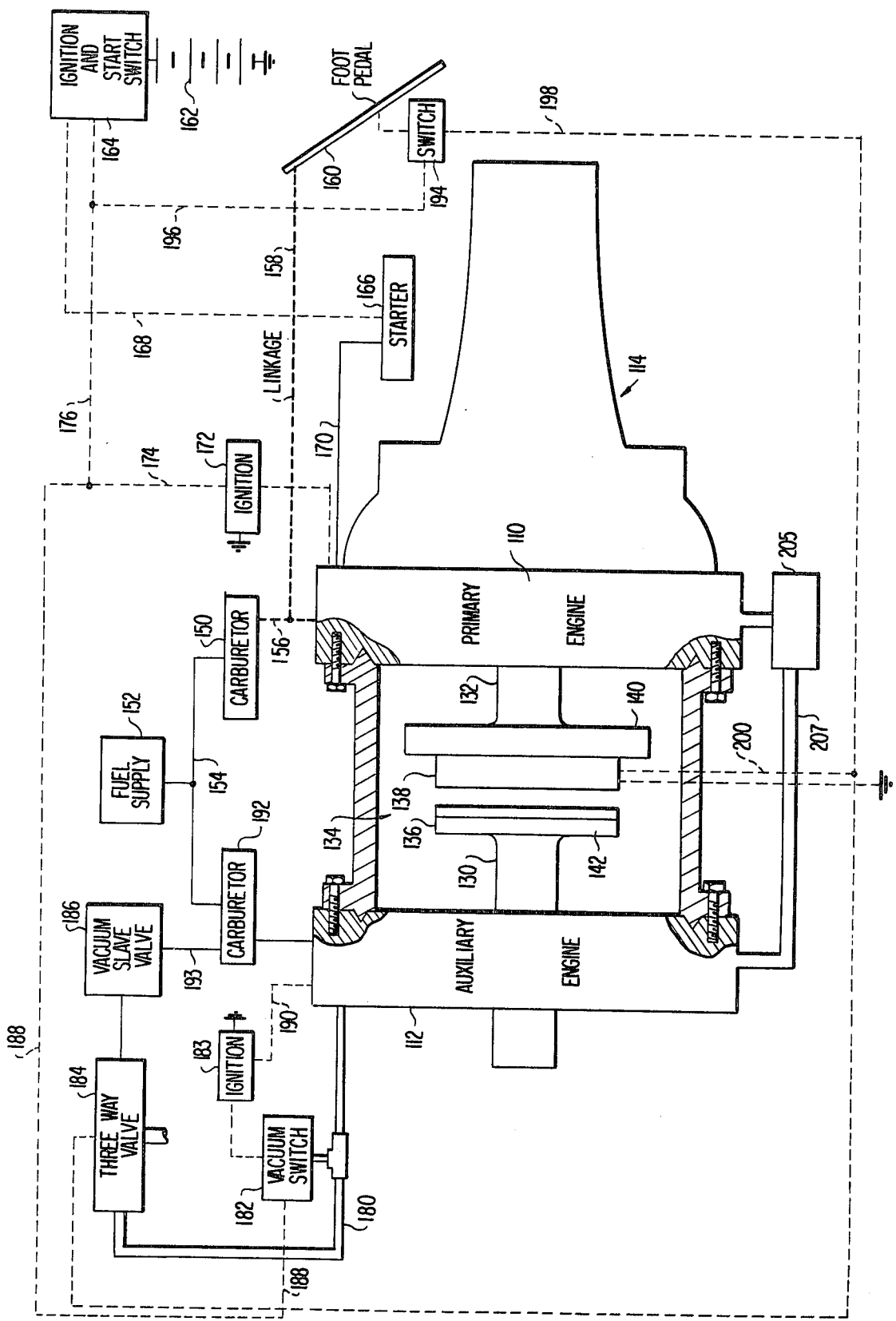

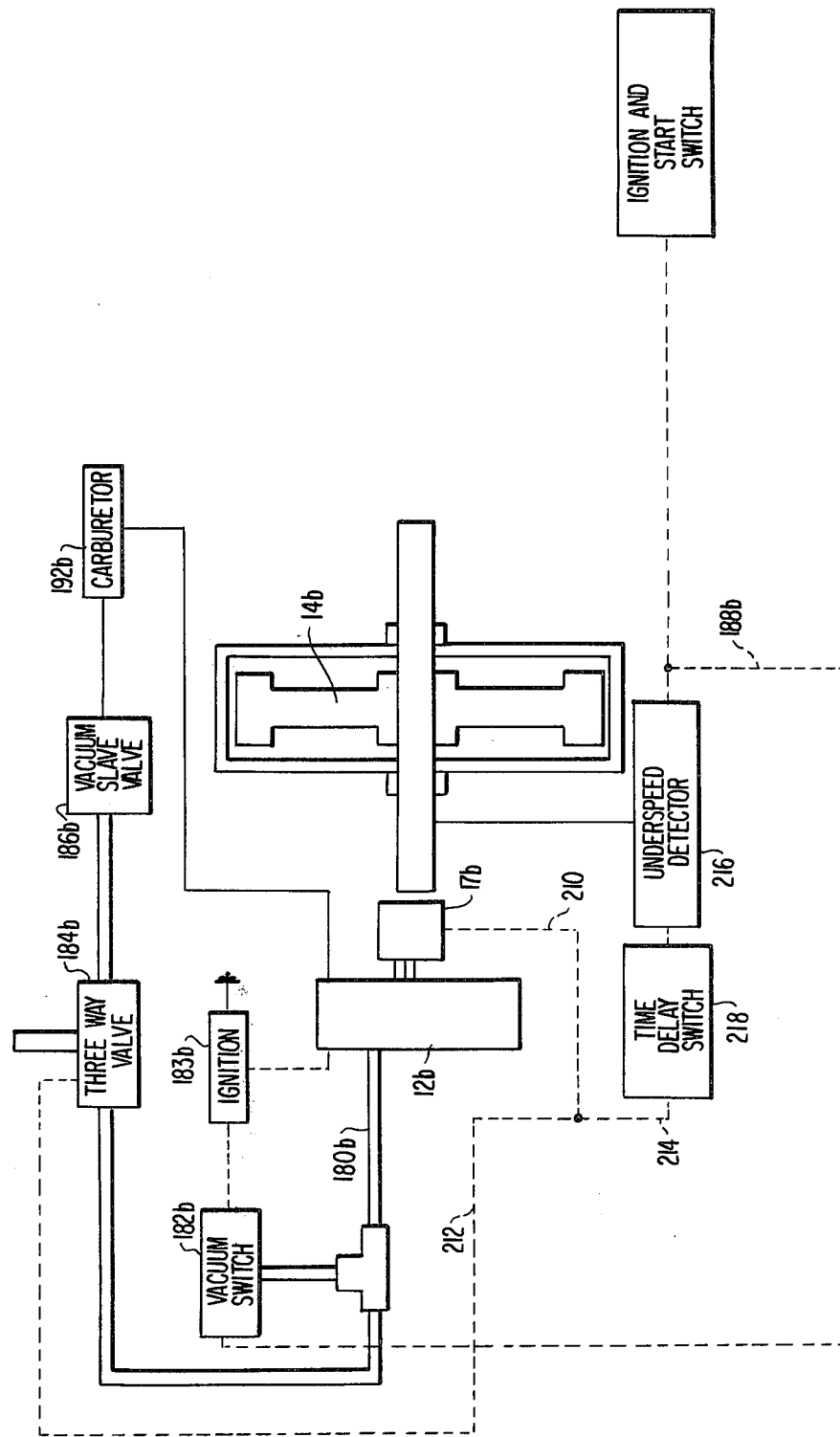

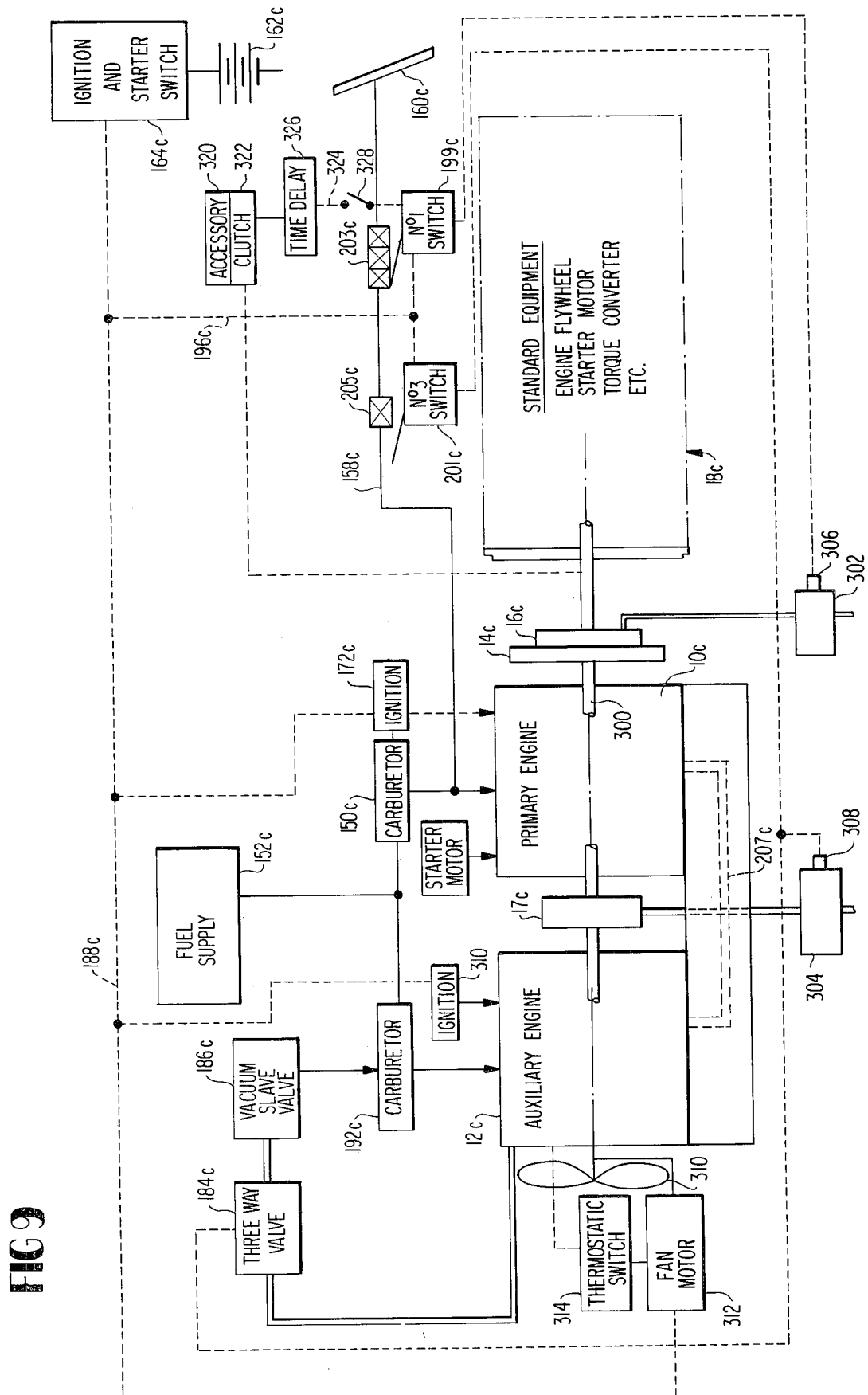

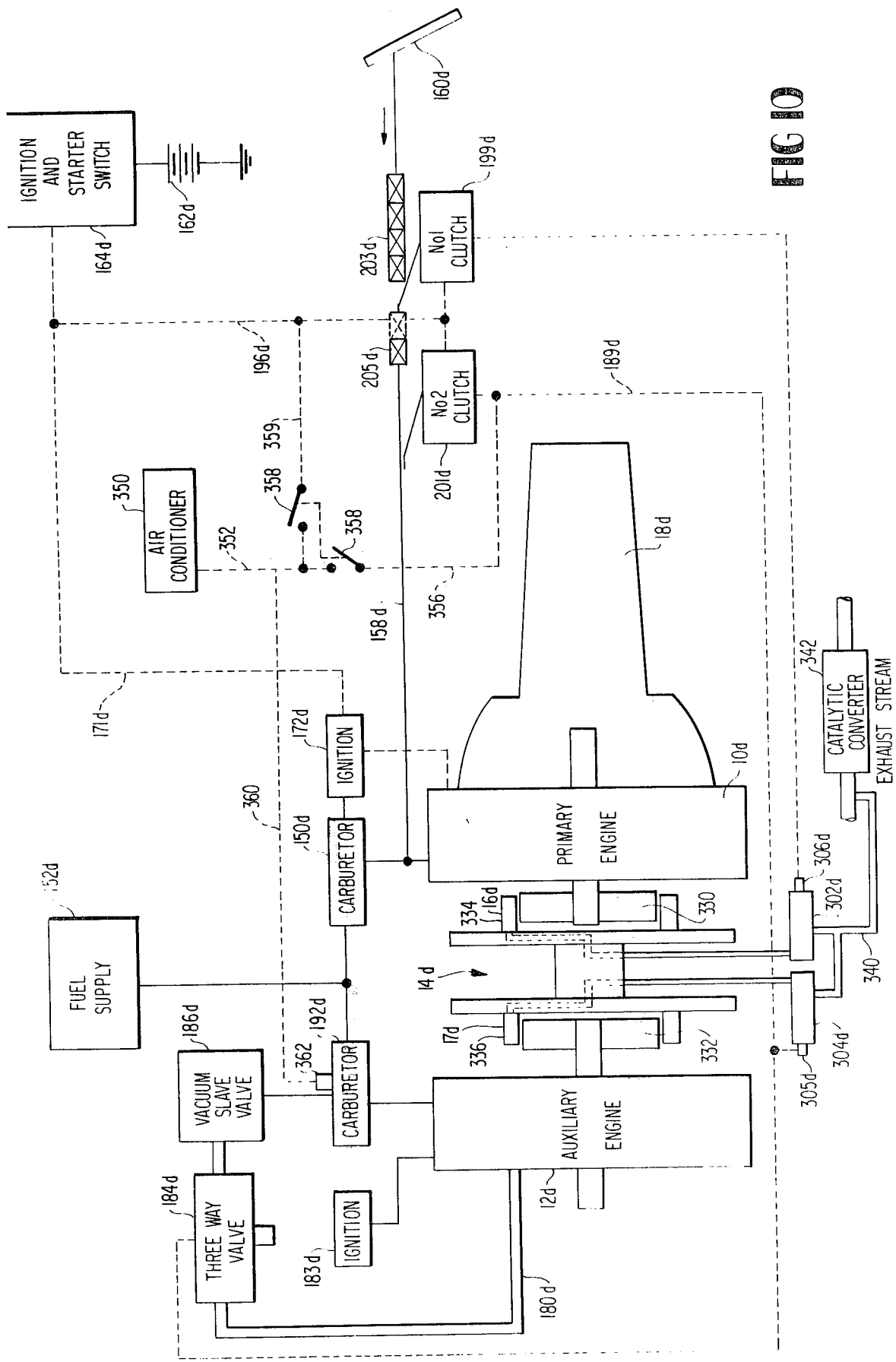

MODULAR ENGINE ASSEMBLY

FIELD OF THE INVENTION

This application is a continuation-in-part of application Ser. No. 652,326 filed Jan. 26, 1976 now U.S. Pat. No. 4,027,485 for MODULAR ENGINE ASSEMBLY and also application Ser. No. 650,374 filed Jan. 19, 1976 now U.S. Pat. No. 4,027,484 for MODULAR ENGINE ASSEMBLY; application Ser. No. 652,326, in turn, being a continuation-in-part and application Ser. No. 650,374 in turn being a division of prior application Ser. No. 557,746 filed Mar. 12, 1975 for MODULAR ENGINE ASSEMBLY, now U.S. Pat. No. 3,949,556 dated Apr. 13, 1976.

The fields of art to which the invention pertains include the fields of internal combustion engines, modular engines of piston, rotary and other types and energy storage devices including flywheels.

BACKGROUND AND SUMMARY OF THE INVENTION

Conventional internal combustion engines operate on all cylinders regardless of power requirements, relying upon transmission shifts and/or fuel supply to vary the torque provided in accordance with demand. During most normal driving cycles only a portion of available engine power is utilized, but the entire engine is used for that portion of power. The result is inherent inefficiency of operation, wasted energy, excessive fuel consumption and excessive pollutant emissions.

The present invention overcomes many of the disadvantages of the usual internal combustion engines. In accordance with one form of the present invention, a modular engine assembly is provided which incorporates a kinetic energy storing device, for example a "floating" flywheel, and a plurality of engines which selectively engage the flywheel via automatic clutches. Initially, the vehicle transmission is driven by a single, primary engine which also drives the flywheel. As additional power is required, as indicated by a torque sensor, or as demanded by an overriding foot pedal position, an auxiliary engine (one or more) is initially started by clutch coupling to the flywheel and thereafter aids the primary engine in driving the transmission.

Modular design enables the practical use of inexpensive, efficient, low polluting, small bore internal combustion engines (e.g. 30–150 cubic inches displacement). Synchronization of spark firing of the primary and auxiliary engines is readily accomplished by a commercially available mini-computer device. While the primary engine includes a starter and manual or automatic choke, the auxiliary engine is supplied, in one form hereof, with a fixed, idealized air/fuel ratio, such as stoichiometric or leaner. Heat transformed from the primary engine to the auxiliary engine maintains the auxiliary engine in a "ready" condition.

In one form of the present invention, a sealed housing is provided around the flywheel and vacuum therein is established by connection to the intake manifold of the primary engine. Additionally, the primary engine drives the alternator, air conditioner, and/or other pumps and the like, in the usual manner. A hydrostatic transmission may be utilized which provides smooth, full-range control of speed and torque. Fluid slip clutches, such as silicon fluid clutches, may also be utilized to provide full floating operation of the flywheel during braking and idling conditions.

The present modular-floating flywheel construction also enables the primary engine to stop, rather than be operating, during a temporary pause in vehicle travel, since the flywheel will act to start the primary engine as well as the auxiliary engine. The result is a further reduction in fuel consumption and air pollution.

The "floating" flywheel permits a smoothness of operation usually obtained only with rotary power engines, enables the storage of normally wasted energy and provides for rapid acceleration when required. The effective horsepower of the engine is thus effectively increased. The primary and auxiliary engines can be identical or can be different, and engines as small as 20 horsepower can be used in conjunction with a larger (50–75 horsepower) engine to effectively drive a full sized automobile. Each engine is complete within itself, having the standard balancing flywheel, common to reciprocating piston engines. Pollutant emissions are low as a result of the extremely low fuel consumption and ability to drive the auxiliary engine with a fixed air/fuel ratio. Accordingly, the present invention provides an advantageous solution to current critical problems of fuel shortage and air pollution.

In another form of the present invention, primary and auxiliary engines of the rotary type are selectively coupled and decoupled one to the other depending upon power requirements during a particular driving condition. The mechanism for coupling and decoupling the engines includes a clutch having a heavy flange and which flange is continuously driven by the primary engine. The flange stores kinetic energy under normal conditions during which additional power beyond that afforded by the primary engine alone is not required. When such additional power is required, the clutch is actuated to couple the auxiliary engine to the rotating flange and the primary engine. The stored kinetic energy is utilized to bring the auxiliary engine up to or turn it over to a predetermined speed.

As the auxiliary engine is brought up to such speed by transfer of the stored kinetic energy from the flange to the auxiliary engine, a vacuum pressure actuated switch turns on the ignition for the auxiliary engine. Subsequently and at a higher vacuum pressure, an electrically actuated control valve shifts to communicate vacuum pressure from the manifold of the auxiliary engine to a vacuum slave valve. The latter vacuum, when subjected to such vacuum pressure, opens the throttle valve in the carburetor of the auxiliary engine. Thus, a fuel-air mixture is provided the auxiliary engine only after it is brought up to speed and its ignition is on. This substantially reduces emissions and provides for a lean burn.

In shutting down the auxiliary engine, the sequence is reversed. That is, the clutch is deenergized and the auxiliary engine is disconnected from the drive train. The control valve also shifts causing the slave valve to close the throttle valve and prevent further delivery of the fuel-air mixture to the auxiliary engine. As the auxiliary engine winds down, the vacuum switch turns off the ignition. By turning the ignition off after delivery of the fuel-air mixture is stopped, emission of unburned fuel is prevented. This vacuum operated system may also be utilized with primary and auxiliary engines of the piston as well as rotary types.

While the previously described forms of the present invention locate the kinetic energy storing device between the auxiliary engine and primary engine, another form of the present invention locates the kinetic energy storing device between the primary engine and the transmission, i.e. on the side of the primary engine remote from the auxiliary engine. This provides a more compact modular engine assembly, affords additional room in the engine compartment, enables the auxiliary and primary engines to be located together, which is mechanically and operationally desirable, enables production of the two engines on a single frame or base, and permits the main engine bearings to be more closely balanced, all while retaining the advantageous features of the modular engine assembly hereof.

In operation, the kinetic energy storing device is clutched to the primary engine whereby it is continuously driven thereby. When additional power is required, the clutch between the auxiliary engine and primary engine is actuated to couple the auxiliary engine to the primary engine and the kinetic energy storing device. Thus, the stored kinetic energy brings the auxiliary engine up to speed. In this form, the ignition to the auxiliary engine is maintained in an on condition, Thus, when the vacuum pressure actuates a control valve which results in opening the throttle valve in the carburetor, the auxiliary engine is fired and drives the transmission through the primary engine and the kinetic energy storing device. In shutting down the auxiliary engine, this sequence is reversed.

A further feature of the present invention resides in the circulation of a cooling fluid from the primary engine to the auxiliary engine at all times. In this manner, the auxiliary engine serves as a heat sink which is sufficient throughout substantially 90% of the driving cycle to maintain the primary engine cool. Thus, the primary engine need not be loaded throughout the majority of its driving cycle by a fan and consequently improved efficiency and economy is obtained. For that small portion of the driving cycle requiring auxiliary cooling, a fan is provided which is driven by a fan motor under the control of a thermostatic switch. When the cooling fluid reaches a predetermined temperature, the thermostatic switch actuates the fan motor to drive the fan and cool the auxiliary engine and circulating cooling fluid therein. When the engine temperature is reduced below the predetermined temperature, the thermostatic switch cuts off the fan motor.

In a further embodiment of the present invention, air actuated clutches are disposed between the flywheel and both the primary and auxiliary engines. The exhaust side of the air actuated clutches communicates with the exhaust stream. Upon deceleration, the auxiliary engine is declutched from the primary engine and the kinetic energy storing device. As is well known, increased quantities of unburned hydrocarbons are exhausted during deceleration. By directing the exhaust air from the clutch at the same time deceleration occurs, the exhaust air assists to more completely burn the hydrocarbons in the exhaust system.

Accordingly, it is the primary object of the present invention to provide a novel and improved modular engine assembly.

It is another object of the present invention to provide a novel and improved compact modular engine assembly.

It is still another object of the present invention to provide a novel and improved modular engine assembly having improved cooling characteristics.

It is a further object of the present invention to provide a novel and improved modular engine assembly having improved operation of automotive accessories and air conditioners.

It is a further object of the present invention to provide a novel and improved modular engine assembly having improved burning of the hydrocarbons in the engine exhaust.

It is a related object of the present invention to provide a novel and improved engine assembly having stored kinetic energy engine startup assistance.

To achieve the foregoing objects and other advantages in accordance with purposes of the present invention as embodied and broadly described herein and in one aspect thereof, the modular engine assembly of this invention is adapted for driving connection with a transmission and comprises a primary engine, means for starting the primary engine, an auxiliary engine disposed in tandem with the primary engine, means adjacent the end of the primary engine remote from the auxiliary engine for connecting the primary engine to the transmission for driving the latter by the primary engine, means for selectively coupling and decoupling the auxiliary engine and the primary engine one to the other for driving the transmission selectively by the primary engine or both the primary engine and the auxiliary engine and means for starting the auxiliary engine including means for storing kinetic energy developed by the primary engine and applying the kinetic energy to the auxiliary engine to assist in starting the auxiliary engine, the kinetic energy storing means and applying means being located adjacent the end of the primary engine remote from the auxiliary engine.

In another aspect of the present invention, there is provided an engine assembly for connection with the transmission driven thereby including an engine, means for connecting the engine to the transmission for driving the latter by the engine, means for starting the engine including means for storing kinetic energy developed by the engine when started, the kinetic energy storing means being located between the engine and the transmission, means for selectively coupling and decoupling the engine and the kinetic energy storing means one to the other, and means for controlling the coupling and decoupling means whereby the engine may be decoupled and stopped during low energy requirements and coupled to the kinetic energy storing means to apply kinetic energy stored thereby to the engine and assist in starting the engine.

BRIEF DESCRIPTION OF THE DRAWINGS

FIG. 1 is a perspective view, including schematic representations, of a modular engine assembly constructed in accordance with the present invention;

FIG. 2 is a schematic block diagram of the modular engine assembly of the present invention and related components;

FIG. 3 is a cross-sectional view of the flywheel and housing, taken on line 3—3 of FIG. 1, in the direction of the arrows;

FIG. 5 is a schematic block diagram of the modular engine assembly of FIG. 4 and illustrating the control system therefor;

FIG. 7 is a schematic block diagram of an underspeed control for the modular engine assembly illustrated in FIG. 1;

FIG. 9 is a schematic block diagram of another form of modular engine assembly constructed in accordance with the present invention;

FIG. 10 is a schematic block diagram of still another form of modular engine assembly constructed in accordance with the present invention;

DETAILED DESCRIPTION

Figure 4:
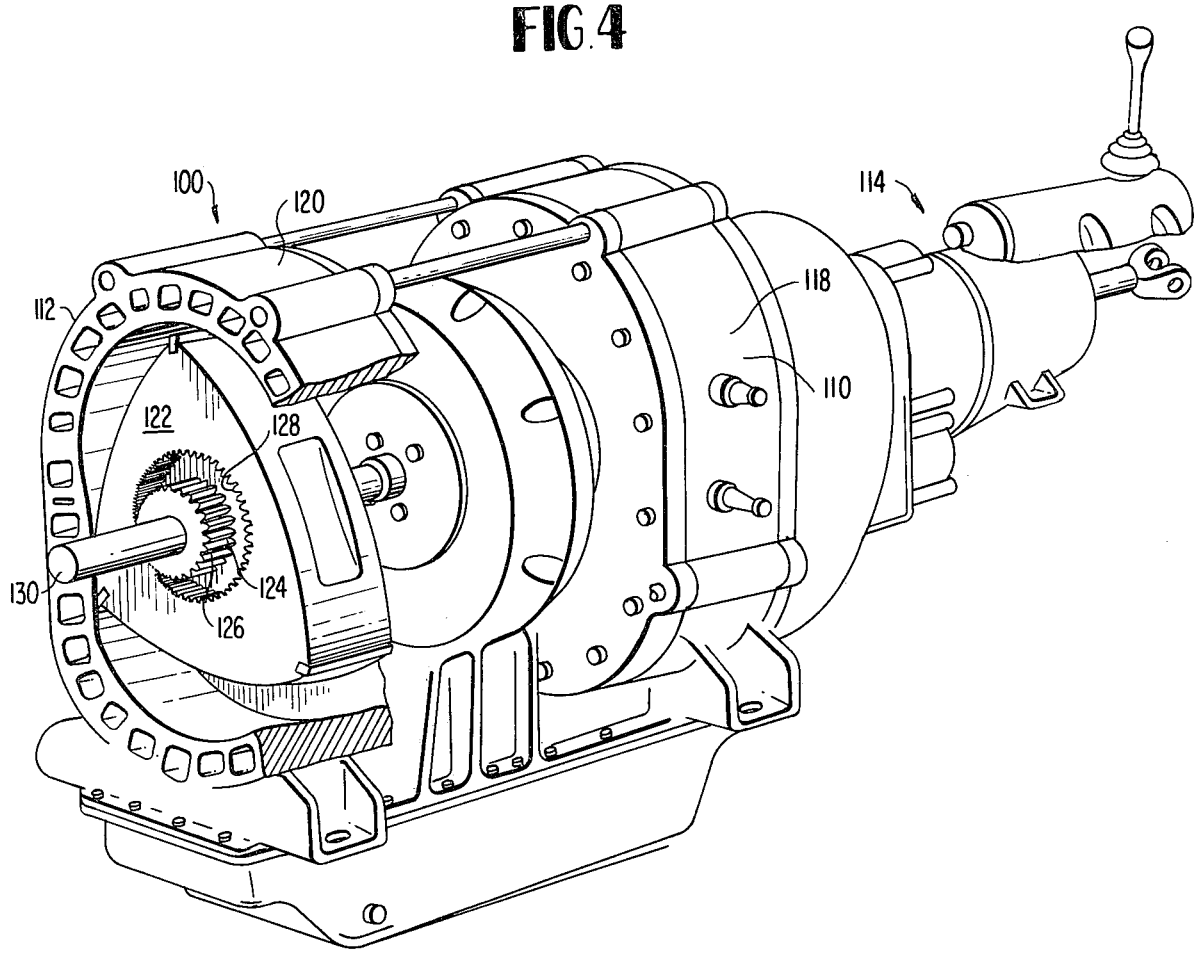
FIG. 4 is a perspective view with parts broken out and in cross section of another form of modular engine assembly constructed in accordance with the present invention.

Referring to FIG. 1, a modular engine assembly is illustrated utilizing a primary engine 10 and an auxiliary engine 12 between which is tandemly mounted a "floating" flywheel 14. The term "floating" is utilized to indicate that the flywheel rotates free of the engine when the engine is braked or the like. This is accomplished by means of automatic slip clutches 16 (FIG. 2) and 17 located one on each side of the flywheel 14 and by means of which the engines 10 and 12 are respectively coupled to the flywheel. The clutches 16 and 17 may be fluid-fed slip clutches as will be described in more detail hereinafter. The primary engine is connected to a transmission, shown schematically in FIG. 1, at 18. The transmission is preferably a hydrostatic transmission as will be described in more detail hereinafter, but any commercial transmission can be satisfactorily utilized.

Auxiliary engines are maintained in a "ready" or "go" condition by heat transferred from the primary engine 10 to the auxiliary engine 12. A preferred method for air cooled engines is by wrapping heat conductive tubing "around" the primary engine, that is filled with a liquid such as "DowTherm". A small pump 13 is driven by the primary engine. When water cooled engines are used the cooling medium is pumped through all engines simultaneously. Another method would be to utilize exhaust from the primary engine.

The primary engine 10 is connected to the transmission by means of a drive shaft 20 on which is located a torque sensor 22. As schematically indicated by the line 23, the torque sensor 22 transmits a signal to a solenoid valve 24 which actuates the auxiliary engine clutch by permitting clutch fluid to enter the clutch 17 from a pump therefor, indicated schematically at 25. Operation of the clutch 17 couples the flywheel 14 to the auxiliary engine 12. A standard accelerator foot pedal 26 is electrically connected, as indicated by the line 28, to operate a solenoid valve 29 to similarly actuate the primary engine clutch 16 to couple the primary engine 10 to the flywheel 14. As will be described hereinafter, and as indicated by the line 45, the pedal 26 is also capable of actuating the auxiliary engine clutch 17.

Operation of the assembly can be further illustrated by referring additionally to FIG. 2. The primary engine is started by means of an engine starter 32 of conventional construction. As indicated schematically by the line 33, depression of the foot pedal 26 mechanically and variably delivers fuel from a supply 34 thereof to the primary engine 10. Additionally, as the foot pedal 26 is depressed, it immediately makes electrical connection to the solenoid valve 29, indicated 35, to actuate the primary engine clutch, coupling the flywheel 14 to the primary engine 10.

In an alternative embodiment, starting the primary engine 10 results in a signal to the solenoid valve 29 for actuation of the primary engine clutch 16. In this alternative mode, as long as the primary engine 10 is operating, the primary engine clutch 16 is operable.

The auxiliary engine 12 is actuated either automatically or manually. In the automatic mode, a signal is derived from the torque sensor 22 on the primary engine drive shaft 20, which is applied via line 36 to an ignition relay 38 to provide electrical ignition to the auxiliary engine 12 as indicated by the line 40. Additionally, a signal from the torque sensor actuates the solenoid valve 24, via line 41, which in turn actuates the auxiliary engine clutch 17 to couple the flywheel to the auxiliary engine 12. In the manual mode of operation, an electrical switch 44 is closed by depressing the foot pedal 26 to a low point which results in actuation of the ignition relay 38 via line 43, and of the auxiliary engine clutch 17 via line 45 and the solenoid valve 24.

As above-mentioned, the foot pedal 26 mechanically delivers fuel from the supply 34 to the primary engine (by carburetion not shown) at a variable rate proportional to depression of the foot pedal. As indicated by the line 46, the auxiliary engine receives fuel from the fuel supply 34, but the fuel is received at a fixed rate (by metering carburetion not shown) which is predetermined for optimum economy and/or pollution reduction. Accordingly, during normal operation of the vehicle containing the modular engine, the foot pedal is depressed to provide variations in speed and/or power, in the usual manner, but when it is desired to accelerate, the foot pedal can be depressed to its bottommost position whereupon the switch 44 is closed, actuating the auxiliary engine clutch 17 and auxiliary engine ignition. The flywheel 14 then serves to start the auxiliary engine 12 which thereby adds power to the primary engine via the clutches 16 and 17.

It will be appreciated that the major components hereinabove referred to are state of art and in most cases, commercially available. As indicated, one can utilize duplicate engines for the primary engine 10 and auxiliary engine 12 or one can use different engines. Preferably, the primary engine 10 is the more powerful of the two or more engines utilized and can conveniently range in horsepower from 20 to 75 horsepower and the auxiliary engine can range in power from 10 to 50 horsepower. With a primary engine of about 65 horsepower, only a single auxiliary engine of about 45 horsepower is needed for the ordinary 5 or 6 passenger vehicle. With such modest horsepower requirements for each engine, one can choose from any number of inexpensive, efficient small engines whether they be rotary, reciprocal, two-stroke, four-stroke, diesel, or otherwise. To exemplify a particular embodiment, one can use a BMW Model R90/6 engine, with 65 horsepower, as the primary engine 10. As the auxiliary engine 12, one can use a BMW Model R/60/6 engine of 45 horsepower. Both engines are two cylinder, four-stroke horizontally opposed engines which are air cooled and constructed of a light alloy material providing low weight. The 65 horsepower engine develops a maximum torque of about 53 ft/lb at 5500 rpm, has a bore of 3.5", a stroke of 2.8" and a capacity of 55 cubic inches for a compression ratio of 9:1. The 45 horsepower engine has a maximum torque of about 35 ft/lb at 5000 rpm, a bore of 2.9", a stroke of 2.8" and a capacity of 36.5 cubic inches for a compression ratio of 9.2:1.

The automatic clutches 16 and 17 may be fluid clutches such as the silicon fluid clutch available from the Fluid Power Division of the Eaton Corporation, Marshall, Michigan. Such clutches are composed of facing members which are formed with annular grooves so as to intermesh. Viscous silicon fluid is introduced into the grooves through the solenoid valve 24 or 29 or by means of an automatically operated slide valve. The silicon fluid enters the drive chamber between the mating clutch surfaces and, as a result of viscous shear operation, the drive member drives the follower member. The clutch has no metal to metal contact. Accordingly, without the introduction of the silicon fluid, the unit effectively disengages. When engaged, the unit has a measure of slippage permitting the auxiliary engine 12 to smoothly adjust to power demand. With respect to the primary engine 10, after reaching a given rpm, such as 500–2000 rpm, the primary engine clutch 16 engages the flywheel bringing it up to the same rpm as the engine (which generally operates at about 2000–8000 rpm during ordinary vehicle travel). Alternatively, if required for any particular engine utilization, the clutch can be designed so that the primary engine engages the floating flywheel immediately upon start-up.

In the preferred operation, when the brakes are applied the primary engine clutch 16 automatically disengages (as do other clutches if otherwise operative) and the flywheel 14 continues to rotate free of all engines. The primary engine can then be used for braking. When power is again required, energy stored up in the flywheel 15 helps to bring the primary engine to operating speed and to immediately start the auxiliary engine 12 if the torque sensor 22 signals that operation of the auxiliary engine 12 is required.

In an alternative embodiment, control of the primary engine 10 is assigned to the foot pedal 26 so that depression of the foot pedal is required for ignition of the primary engine 10. Such alternative control mode is shown by the dashed line 48 in FIG. 2. In this mode, one would start the primary engine 10 by depressing the foot pedal 26 and concurrently turning the ignition switch and starter 32. One would keep the primary engine 10 running sufficiently long to engage the flywheel 14 and stabilize the same at high speed. Thereafter, the primary engine 10 would stop when the foot pedal is in its uppermost position. Accordingly, one can idle with only the flywheel running normal short pauses. The flywheel then serves to start the primary engine 10 and/or both the primary engine 10 and auxiliary engine 12, when the foot pedal 26 is depressed to actuate the solenoid valve 29 and/or both valves 24 and 29.

Referring to FIG. 3, the flywheel includes a solid member 49 formed of steel and having a weight which can range from 60–150 lbs. Preferably, the solid flywheel member 49 is about 16" in diameter, about 3.5" in thickness through a 9" diameter central portion and tapering to about 1" thickness at its edges. The solid flywheel member 49 is enclosed within a housing 50 which is bolted (at 52 in FIG. 1) through flanges about a gasket 54 so as to seal the housing and form a chamber 56 between the inner housing wall and the solid flywheel member 49. The solid flywheel member 49 is centrally formed with front and rear shafts 58 and 60, respectively, which are journaled for rotation through centrally formed housing openings 62 and 64, respectively. Bearing seals 66 and 68 and bearings 70 and 72 are carried by the housing 50 to facilitate sealed rotation of the flywheel shafts 58 and 60. Additionally, an opening 74 is formed in the side of the flywheel housing 50 and a nipple 76 is threaded into the opening 74. Referring additionally to FIG. 2, flexible tubing 78 connects the nipple 76 to the intake manifold of the primary engine 10 to provide a vacuum 77 within the flywheel chamber 56.

The torque sensor 22 can be of any commercial type and is mounted on the drive shaft 20 connecting the primary engine 10 to the transmission 18. A suitable torque sensor 22 is a torsional variable differential transformer type such as that sold by LeBow Associates, Inc., Troy, Mich. This type of sensor measures the torsional wind-up of a shaft. The drive shaft 20 is made of nonmagnetic material and the LeBow torque sensor 22 includes a sleeve of magnetic material which is mounted on the drive shaft 20. The sleeve has slots that partially close on one side and open on the other side as the shaft twists due to torque. The sleeve portion of the shaft rotates in a magnetic field produced by current carried by a stationary coil mounted in the torque sensor housing. The shaft differentially couples this magnetic field to stationary secondary coils also mounted in the housing. The associated circuitry is designed so that when no torque is being transmitted, the net voltage output is zero. As the shaft twists due to torque, magnetic path differentials are indicated as a voltage output directly proportional to the torque but independent of the rotational speed.

The transmission 18 is preferably a hydrostatic drive which makes possible smooth transmission of the engine horsepower to the drive wheels of the vehicle. A particularly useful transmission is one which serves as a hydrostatic transmission, transmitting all power hydraulically during start-up, but which after start-up transmits most of its power mechanically with a small portion supplied hydraulically. Such a transmission is sold by Sunstrand Corporation, Rapid City, Iowa, under the designation DMT. In the hydrostatic mode, power is transmitted by means of a variable displacement pump and a fixed displacement hydraulic motor. Change to mechanical transmission takes place with no power interruption, the power path being split between the mechanical and hydraulic paths. Such dual mode operation assures maximum power at all speeds.

It will be appreciated that the foregoing description generally has been with respect to commercially available components and that modification thereto in accordance with the principles of the present invention can be readily made. For example, the solid flywheel member 49 can be curved to provide aerodynamic surfaces since the vacuum applied to the flywheel chamber 56 is only a partial vacuum. Other types of transmissions could be used and one could use two or three or even more auxiliary engines.

In accordance with a further form of the present invention, there is illustrated in FIG. 4 a modular engine assembly generally designated 100 comprising a primary engine 110 and an auxiliary engine 112 disposed in tandem. A transmission, generally designated 114, is coupled to the drive shaft, not shown, of primary engine 110. Both the primary and auxiliary engines of this form of the invention are rotary engines, preferably the Wankel type. That is, the primary and auxiliary engines include multi-lobed epitrochoidal outer housings 118 and 120, respectively. Each engine has an inner rotor having a plurality of apices equal to one more in number than the number of lobes, only rotor 122 in the auxiliary engine housing 120 being illustrated. Each rotor and corresponding housing form variable volume working chambers.

A conventional Wankel type rotary engine generally has a triangular shaped rotor 122 with three apices and is rotatable in a two lobed epitrochoidal housing. The primary and auxiliary engines hereof may each comprise such conventional Wankel engines.

As illustrated, the auxiliary and primary engines have respective drive shafts 130 and 132 (FIGS. 4 and 5). Each shaft extends through suitable bearings, not shown, in the end walls of its associated housing. Shaft 130 carries a gear 124 within a cavity 126 in rotor 122, the wall of rotor 122 defining cavity 126 being internally geared at 128. The shaft 132 of the primary engine 110 is similarly geared to its rotor. As those familiar with Wankel type engines will appreciate, the cavity in the rotor is eccentric relative to the shaft and gear axis and the rotor transmits its rotary motion about the offset axis of the cavity thereby to rotate the shaft. Further description of these Wankel type rotary engines is not believed necessary since each engine per se is conventional.

It will also be appreciated that, while only one auxiliary engine is illustrated and described, the modular engine assembly of this embodiment may likewise, as in the previous embodiment, comprise a plurality of such auxiliary engines tandemly disposed relative to one another and operable as will be evident from the ensuing description.

The shafts 130 and 132 of the auxiliary and primary engines 112 and 110, respectively, are releasably coupled and decoupled one to the other through a clutch, generally designated 134. Clutch 134 is preferably an electric clutch which may be of the type manufactured by the Warner Electric Brake and Clutch Company, Beloit, Wis., and identified as Model PCC-825. As illustrated schematically in FIG. 5, clutch 134 includes an armature 136 carried by shaft 130 of auxiliary engine 112 and a collector ring 138 carried by shaft 132 of primary engine 110. A heavy flange 140 is carried by shaft 132 directly behind collector ring 138 for purposes to be described. Also, a flange 142 is carried by shaft 130 directly behind armature 136 also for purposes to be described. It will be appreciated that primary shaft 132 and auxiliary engine shaft 130 may be coupled to and decoupled from one another by electrical actuation of clutch 134 and that, when coupled, both the auxiliary engine 112 and primary engine 110 drive transmission 114.

Referring now to FIG. 5, a conventional carburetor 150 supplies fuel from a fuel supply 152 to primary engine 110 via conduits 154 and 156. As conventional, carburetor 150 has a fuel control valve, not shown, which is coupled, by a standard mechanical linkage schematically designated by line 158, to the accelerator or foot pedal 160 of the automobile. There is also illustrated in FIG. 5 a battery 162 which is electrically connected to an ignition and starter switch 164. Switch 164 is connected to a conventional starter 166 as indicated by the dashed line 168. Starter 166 is mechanically connected to the primary engine 110 in conventional manner as schematically illustrated by the full line designated 170. Ignition 172 is electrically coupled to the primary engine 110 as indicated by the dashed lines 174 and 176, line 176 being connected at its opposite end to ignition and start switch 164.

Thus, the primary engine may be operated conventionally. For example, the driver of the vehicle may close switch 164 to turn on the ignition to primary engine 110 and to actuate starter 166. Once the primary engine is started, it is controlled conventionally by depressing and relieving pressure on foot pedal 160. Pedal 160, through linkage 158, operates the throttle valve, not shown, of carburetor 150 whereby primary engine 110 delivers greater or lesser power, dependent upon demand, to transmission 114.

Connected to the intake manifold of auxiliary engine 112 is a conduit 180. Serially connected in conduit 180 is an electric vacuum actuated switch 182, a three-way solenoid actuated vacuum control valve 184, and a vacuum actuated slave valve 186. Vacuum switch 182 is electrically connected to ignition and starter switch 164 as indicated by dashed lines designated 188 and 176. Vacuum switch 182 is also electrically connected, as indicated by the dashed line designated 190, to the ignition 183 for auxiliary engine 112. Vacuum switch 182 comprises a spring loaded diaphragm arrangement which closes a normally open electrical switch in response to sensing a predetermined vacuum. That is, vacuum switch 182 provides an electrical switching function in response to a given vacuum signal from auxiliary engine 112 through conduit 180. Thus, in the present embodiment, electrical switch 182 is normally open and the ignition to auxiliary engine 112 is normally off. Vacuum switch 182 is adapted to close at a predetermined vacuum pressure, for example on the order of 3 inches of mercury, and, when closed, turns on the ignition to auxiliary engine 112. Switch 182 may be of the type manufactured by Borg Warner Corp., Decatur, Ill. and identified as Universal Electric Vacuum Switch.

A carburetor 192 for auxiliary engine 112 is provided and is coupled, preferably through a mechanical linkage schematically illustrated by line 193, to vacuum slave valve 186.

As illustrated in FIG. 5, foot pedal 160 also opens and closes an electrical switch 194 as pedal 160 passes through a predetermined position within its range of movement. Switch 194 is electrically connected to switch 164 and battery 162 as indicated by the dashed line designated 196. Switch 194 is also electrically connected to three-way valve 184 as indicated by the dashed line designated 198. The three-way solenoid actuated vacuum control valve 184 may be of the type manufactured by Borg Warner Corp., Decatur, Ill. and identified as 3-way Solenoid Valve Vacuum Control. Valve 184 normally closes conduit 180 from communication with slave valve 186. Upon actuation of valve 184 in response to closing switch 194, vacuum from the manifold of the auxiliary engine 112 is applied to a pressure sensitive element, not shown, within valve 184. When a predetermined vacuum, for example, 15 inches of mercury, is obtained, valve 184 opens enabling application of vacuum pressure to vacuum slave valve 186.

Vacuum slave valve 186 comprises a conventional valve having a spring loaded diaphragm, not shown, mechanically coupled as indicated by line 193, to carburetor 192. Consequently, the magnitude of vacuum pressure from the intake manifold of auxiliary engine 112 applied to vacuum slave valve 186, once valve 184 enables communication of such vacuum pressure to valve 186, determines the extent to which the valve throttle in carburetor 192 opens. That is, valve 186 controls the throttle valve for carburetor 192 in accordance with the increase or decrease in vacuum pressure of auxiliary engine 112.

As illustrated in FIG. 5, the collector ring of clutch 134 is electrically coupled to line 198 as illustrated by the dashed line designated 200.

The operation of the modular engine assembly described above and illustrated in FIGS. 4 and 5 hereof will now be set forth. As will be recalled, primary engine 110 is started and operated similarly as a conventional automobile engine. In such operation, the large heavy duty flange 140 is also rotated with the primary engine shaft 132. When additional power is desired, foot throttle or pedal 160 is depressed to close switch 194. Closing switch 194 immediately actuates clutch 134 through lines 196, 198 and 200. Actuation of clutch 134 drivingly couples drive shaft 132 of primary engine 110 and the drive shaft 130 of auxiliary engine 112. The heavy duty flange 140 stores sufficient kinetic energy to substantially immediately bring the auxiliary engine 112 up to a predetermined speed without significant loss of power to the primary engine 110. That is, the kinetic energy stored by rotation of the heavy duty flange 140 is utilized to initially rotate shaft 130 and turn over auxiliary engine 112 at a high rate of speed, for example on the order of 700–1000 rpm. It will be appreciated that at this stage of operation the ignition to auxiliary engine 112 is off.

By initially rotating shaft 130 and turning over auxiliary engine 112 at a high rpm, the intake manifold of auxiliary engine 112 is immediately subjected to a vacuum pressure and which pressure is transmitted through conduit 180 to vacuum switch 182. Switch 182 thus senses the vacuum pressure in the auxiliary engine manifold. When a predetermined magnitude of such vacuum pressure is sensed, for example on the order of about 2–3 inches of mercury, switch 182 closes to turn on the ignition to auxiliary engine 112. At this state of operation, however, carburetor 192 remains closed and auxiliary engine 112 is thus not firing.

Also upon closing switch 194, three-way solenoid actuated valve 184 is energized. Upon energization, the vacuum pressure sensitive element of valve 184 is placed in communication with the intake manifold of auxiliary engine 112 via conduit 180. When the vacuum pressure increases in the auxiliary engine manifold to a predetermined magnitude, i.e. on the order of 15 inches of mercury, the pressure sensitive element of valve 184 shifts valve 184 to communicate the vacuum pressure from the intake manifold of auxiliary engine 112 to vacuum slave valve 186. As will be recalled, valve 186 is coupled by linkage 193 to carburetor 192. Thus, in response to the vacuum pressure communicated to it from the intake manifold of auxiliary engine 112, valve 186 causes the throttle valve in carburetor 192 to open and thereby provide a gas-air mixture to the auxiliary engine. When the gas-air mixture is supplied to auxiliary engine 112 and the ignition is on by means of the previously actuated vacuum switch 182, auxiliary engine 112 fires and drives shaft 130. Consequently, auxiliary engine 112 substantially immediately assists the primary engine through the clutch coupling between the auxiliary and primary engines to drive transmission 114. Valve 186 also controls the throttle valve on carburetor 192 to vary the ratio of the gas-air mixture admitted to auxiliary engine 112 in accordance with the vacuum pressure of the auxiliary engine manifold as sensed by the slave valve 186.

It will be appreciated that the auxiliary engine does not have a starter motor per se. It fires only when it has obtained a predetermined speed and pulls a predetermined vacuum pressure. In this manner, fuel consumption during start-up of the auxiliary engine is sharply curtailed. Undesirable emissions are also sharply reduced.

As in the prior embodiment, the auxiliary engine can be maintained in a warmed ready status. For example, a water pump 205 and conduit 207 may interconnect the cooling systems of the primary engine 110 and the auxiliary engine 112. Consequently, when the auxiliary engine is turned on, it approximates its operating temperature and does not require a warm-up period. Also, a common oil pump and sump for both engines could be utilized.

When the additional power provided by the auxiliary engine is no longer needed, foot pedal 160 is relieved and switch 194 opens. Opening switch 194 deenergizes clutch 134 and shafts 130 and 132 are thus immediately decoupled one from the other. The three-way solenoid actuated valve 184 is also deenergized and shifts to vent conduit 180 to atmosphere. When shifted, valve 184 also closes off communication between vacuum slave valve 186 and the intake manifold of auxiliary engine 112. Valve 186 thus spring returns and closes the control throttle on carburetor 192 precluding further admission of the fuel-air mixture into auxiliary engine 112. As the vacuum pressure increases to atmosphere in the auxiliary engine manifold, vacuum switch 182 opens and turns off the ignition to auxiliary engine 112. By turning the ignition off subsequent to closing the throttle valve in carburetor 192, complete burning of the fuel remaining in the auxiliary engine is ensured. Thus, emission of unburned fuel is prevented.

Figure 6:
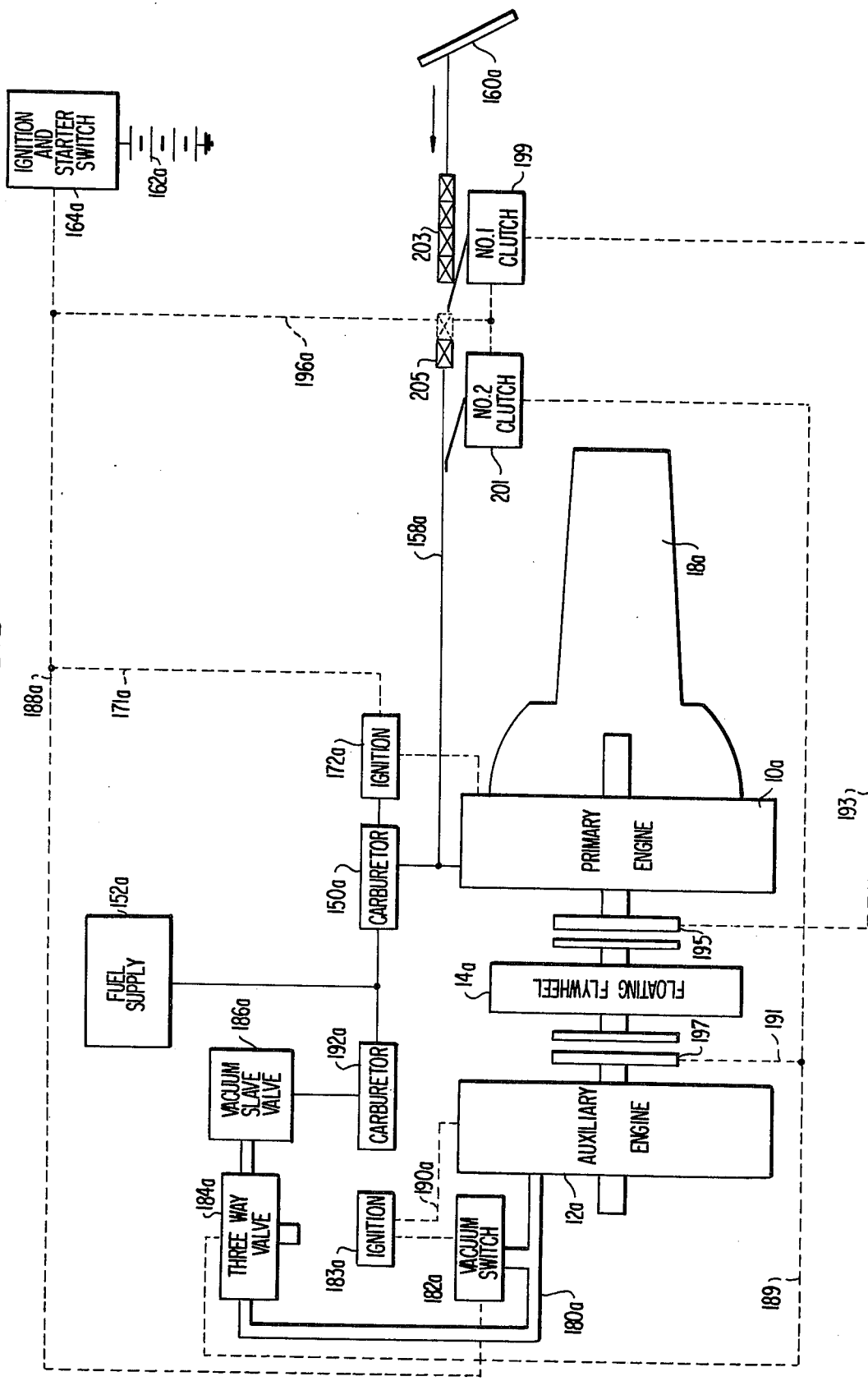
FIG. 6 is a view similar to FIG. 5 illustrating a similar control system applied to the modular engine assembly illustrated in FIG. 1.

It will be appreciated that the auxiliary engine control system including the start-up, vacuum carburetor control and shut-down described above with respect to FIGS. 4 and 5 is also useful in non-rotary type engines, such as those illustrated in the embodiment hereof of FIGS. 1–3. Also, such control system may be utilized in a modular engine assembly having a flywheel interconnecting the primary and auxiliary engines and the engines of such assembly may be rotary, piston or other types as desirable. For example, a similar control system is illustrated in FIG. 6 in conjunction with the modular engine assembly illustrated in FIGS. 1–3. Like parts as described and illustrated in the prior modular engine assembly of FIGS. 1–3 and the control system of the modular engine assembly of FIGS. 4–5 are designated in FIG. 6 with like reference numerals followed by the suffix a. In this form, electric clutches 195 and 197 are coupled between the flywheel 14a and the respective primary and auxiliary engines to selectively couple and decouple the engines relative to the flywheel 14a. Normally open switches 199 and 201 electrically connect clutches 195 and 197 with battery 162a through the starter switch 164a, line 196a and lines 193 and 191 respectively. Thus, in FIG. 6, the primary engine 10a is operated in the conventional manner. Depression of foot pedal 160a also closes clutch switch 199 by means of a mechanical switch actuating element 203 on carburetor linkage 158a. Closing switch 199 energizes clutch 195 and drivingly couples flywheel 14a to primary engine 10a.

When additional power is needed, the pedal 160a is further depressed and a mechanical switch actuating element 205 on carburetor linkage 158a closes clutch switch 201. Closing switch 201 energizes clutch 197 to couple the flywheel to the auxiliary engine whereby the kinetic energy of the flywheel is utilized to bring the auxiliary engine up to a predetermined speed. When a predetermined magnitude of vacuum pressure is sensed, i.e. 2 or 3 inches of mercury, switch 182a turns on the ignition to auxiliary engine 12a. At a greater magnitude of vacuum pressure as sensed by valve 184a, valve 184a shifts to place vacuum slave valve 186a in communication with the auxiliary engine's intake manifold via conduit 180a. Valve 186a thus opens the throttle valve of carburetor 192a and enables auxiliary engine 12a to fire and drive transmission 18a through the flywheel 14a. Valve 186a also controls the ratio of the fuel-air mixture in response to changes in vacuum pressure in the auxiliary engine's manifold.

Auxiliary engine shut-down is accomplished similarly as previously described. When additional power is no longer needed, foot pedal 160a is relieved and element 205 enables clutch switch 201 to open. Opening clutch switch 201 deenergizes clutch 197 thereby decoupling the auxiliary engine from the flywheel and drive train. Opening switch 201 also enables valve 184a to shift which, in turn, enables valve 186a to close the throttle valve in carburetor 192a. Subsequently, as the manifold pressure approaches atmospheric pressure, switch 182a opens to turn off the ignition to auxiliary engine 12a.

Referring now to FIG. 7, there is illustrated a further improved form of the invention hereof illustrated in FIGS. 1-3. Particularly, it will be recalled that the flywheel of the embodiment hereof illustrated in FIGS. 1-3 may be declutched or decoupled from both the primary and auxiliary engines, for example when stopping at a stop light. Under such conditions, it is possible that flywheel 14 can slow sufficiently to be incapable of bringing the auxiliary engine up to the predetermined speed desirable before the auxiliary engine is started or fired. The form of the present invention illustrated in FIG. 7 provides for the detection of such condition and for starting the auxiliary engine and declutching it to the flywheel in response thereto. Thus, the flywheel is brought back up to speeds sufficient to subsequently start the one or more auxiliary engines utilized upon further demand for power.

To this end, auxiliary engine 12b illustrated in FIG. 7 is started as previously described with respect to the embodiments hereof illustrated in FIGS. 4-6. That is, vacuum switch 182b, the three-way solenoid actuated valve 184b, vacuum slave valve 186b, and carburetor 192b, are used as previously described to turn on the ignition to auxiliary engine 12b and to supply the fuel-air mixture thereto. Also, clutch 17b interposed between auxiliary engine 12b and flywheel 14b is electrically coupled via lines 210 and 212 to the three-way solenoid actuated valve 184b. Line 188b electrically connects vacuum switch 182b to the power supply. The clutch 17b is also electrically coupled via lines 214 and 210 to an underspeed detector 216 and time delay switch 218 connected in series in line 214. Underspeed detector 216 may be of the type manufactured by Peco Corporation, 450 Landess Avenue, Milpitas, Calif., 95035 and designated Model SM Modular Control C-3177. When a speed below a predetermined speed of flywheel 14b is sensed by underspeed detector 216, it energizes clutch 17b through time delay switch 218. Simultaneously it energizes the three-way solenoid actuated valve 184b line 212. The auxiliary engine is thus started similarly as previously described with clutch 17b drivingly coupling the auxiliary engine 12b to flywheel 14b. In this manner, flywheel 14b is brought up to the predetermined speed. Upon expiration of the predetermined time delay of switch 218, switch 218 opens deenergizing clutch 17b and the solenoid of valve 184b. Valve 184b shifts to stop auxiliary engine 12b in the manner previously described with respect to FIGS. 4-6. Decoupling clutch 17b from the auxiliary engine and flywheel enables the flywheel to run freely at or above the desired speed. The time delay switch 218 automatically resets itself. It will be appreciated that the underspeed control described herein is useful with the flywheel particularly when the flywheel is decoupled from both the auxiliary and primary engines.

It will be recalled, with reference to FIG. 2, that the engine 10 may be started and the clutch between the engine 10 and flywheel 14 engaged upon depression of foot pedal 26. Also, engine 10 stops and the clutch disengages when the foot pedal lies in its uppermost position. Thus, as noted previously, engine 10 may be stopped and declutched from the flywheel when, for example, pausing at a traffic signal. When power is required, depression of foot pedal 26 clutches the flywheel to the primary engine whereby the primary engine is immediately brought up to speed by the flywheel and started. This has particular advantage in reducing emissions when idling.

The combination of a device for storing kinetic energy and a single engine selectively coupled and decoupled one to the other through a clutch may be utilized to reduce emissions particularly when idling and without one or more additional engines disposed in tandem therewith. Consequently, the combination of a flywheel, clutch and engine may be utilized in an automobile such that the engine is stopped during short pauses and restarted through actuation of the clutch whereby the kinetic energy stored in the flywheel is immediately applied to the engine and the latter is brought immediately up to speed with consequent reduction in emissions during idling.

Figure 8:
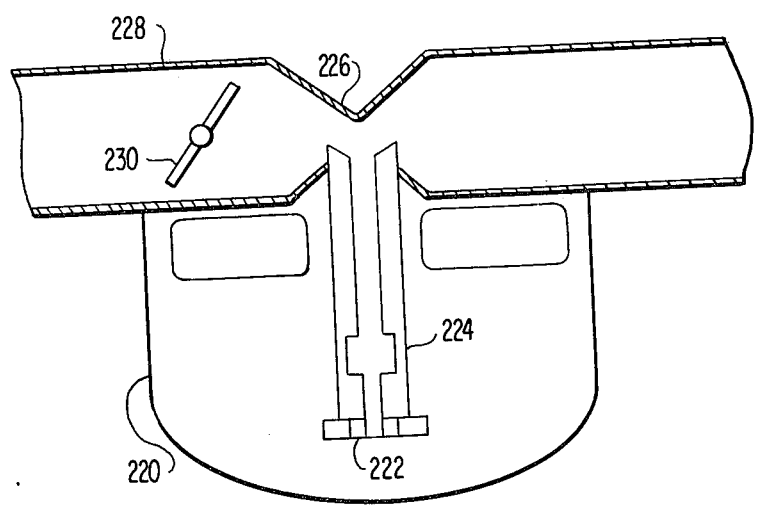
FIG. 8 is an enlarged cross-sectional view of a carburetor for use with the auxiliary engine and control systems therefor illustrated in FIGS. 5 and 6.

Referring now to FIG. 8, there is illustrated a carburetor particularly useful for the auxiliary engine in any one of the various forms hereof. Particularly, FIG. 8 discloses a float control bowl 220 and a main jet 222 disposed in the bowl Jet 222 has an atomizing tube 224 which is open at its upper end to the venturi section 226 of the flow conduit 228 of the auxiliary engine. A throttle control valve 230 is disposed upstream of the venturi section 226 and is under the control of the vacuum slave valve.

Referring now to FIG. 9, there is illustrated a further improved embodiment of the modular engine assembly of the present invention. In this embodiment, the kinetic energy storing means, i.e. the rotating mass of flywheel, is located between the primary engine and the transmission. When the primary and auxiliary engines are disposed in tandem, the kinetic energy storing means is thus located remote from the auxiliary engine. As noted previously, this enables the engines to be located closer to one another, which is mechanically and operationally desirable, thus affording a more compact modular engine assembly. This also facilitates production of the two engines on a common base while simultaneously providing for the advantageous features of modular engine operation in accordance with the present invention. Still further, locating the kinetic energy storing means between the primary engine and the transmission provides a more balanced load on the primary engine bearings.

Specifially, in the embodiment of the invention illustrated in FIG. 9, like parts of the modular engine assembly as described and illustrated in FIG. 6 hereof are desiganted in FIG. 9 with like reference numerals followed by the letter suffix c. The auxiliary engine 12c, primary engine 10c, the kinetic energy storing means, i.e. a rotating mass or flywheel 14c, and the transmission, generally designated 18c are disposed in tandem relative to one another. In this embodiment, the kinetic energy storing means 14c is located behind the primary engine 10c, that is, on the side of the primary engine 10c remote from from auxiliary engine 12c and between the primary engine 10c and transmission 18c. The shaft 300 of primary engine 10c extends toward transmission 18c and a clutch designated 16c is disposed about shaft 300 for coupling and decoupling flywheel 14c to and from shaft 300. Clutch 16c of this embodiment preferably comprises an air actuated clutch of known construction under control of a valve 302 actuated by solenoid 306. When valve 302 supplies air from a source of air under pressure, not shown, to clutch 16c upon energization of solenoid 306, it couples flywheel 14c to shaft 300 for unitary rotation therewith. When air is exhausted from clutch 16c upon de-energization of solenoid 306, flywheel 14c is freewheeling on bearings, not shown, about shaft 300.

A similar air actuated clutch 17c under control of a valve 304 actuated by solenoid 308 is disposed between auxiliary engine 12c and primary engine 10c. When air is supplied clutch 17c upon energization of solenoid 308, clutch 17c couples auxiliary engine 12c to primary engine 10c and to flywheel 14c whereby transmission 18c is driven by both the auxiliary and primary engines. When air is exhausted from clutch 17c, auxiliary engine 12c is decoupled from transmission 18c, primary engine 10c, and flywheel 14c. Normally open switches 199c and 201c are electrically connected to solenoids 306 and 308 respectively whereby clutches 16c and 17c remain normally inactivated.

In this embodiment of the invention, ignition 310 for auxiliary engine 12c is maintained in an "on" condition at all times during operation of the modular engine assembly. However, the auxiliary engine 12c remains in an "off" condition with its ignition "on" until the throttle valve of carburetor 192c is opened to introduce the fuel/air mixture into auxiliary engine 12c as described below.

Similarly as in the embodiment illustrated in FIG. 5, the cooling systems of the primary engine 10c and auxiliary engine 12c are interconnected by a conduit 207c. Consequently, the auxiliary engine approximates the operating temperature of the primary engine at all times during operation of the modular engine assembly 55 hereof. Thus, when the auxiliary engine fires, it is already at operating temperature and does not require a warm-up period. It has been found that by circulating the cooling fluid used in the primary engine through the auxiliary engine, the auxiliary engine acts as a heat sink of sufficient capacity to maintain the primary engine cool during approximately 90% of the driving cycle. The primary engine therefore does not require a fan to augment this cooling under normal driving conditions. This enables a still closer spacing of the auxiliary and primary engines relative to one another further reducing the lengthwise dimension of the modular engine assembly.

During that small portion of the driving cycle where additional cooling is required, a fan 310 is disposed in cooling position in front of auxiliary engine 12c. Fan 310 is driven by a fan motor 312 electrically connected in line 188c to the ignition and starter switch 164c. Fan motor 312 is under the control of a thermostatic switch 314 which operates the motor 312 in response to temperatures in the cooling system of the auxiliary engine in excess of a predetermined temperature. Thus, when the temperature of auxiliary engine 12c exceeds the predetermined temperature, thermostatic switch 314 operates to actuate fan motor 312 whereby additional cooling is provided by fan 310. It will be appreciated that this fan arrangement could likewise be provided on the embodiments hereof illustrated in FIGS. 1-3, 4-5, 6 and 7. Also, the fan could be located to directly cool the primary engine with the fan motor being operable in response to the thermostatic switch sensing temperatures directly in the primary engine. However, since it is preferable to locate the fan in front of the engines to draw in air directly, it is preferred that the fan be located directly in front of the auxiliary engine.

In operating the modular engine assembly illustrated in FIG. 9, primary engine 10c is operated in a conventional manner. Depression of foot pedal 160c closes clutch switch 199c by means of the mechanical switch actuating element 203 on carburetor linkage 158c. Closing switch 199c energizes solenoid 306 to shift valve 302 to supply air to clutch 16c whereby flywheel 14c is coupled to shaft 300 of primary engine 10c. As previously noted, flywheel 14c can be started simultaneously with primary engine 10c or shortly thereafter when engine 10c has reached operating speed.

When additional power is needed, foot pedal 160c is further depressed and mechanical switch actuating element 205c closes normally open switch 201c. Closing switch 201c energizes solenoid 308 to shift valve 304 to supply air to clutch 17c. By supplying air to clutch 17c, auxiliary engine 12c is coupled to shaft 300 of primary engine 10c and also to flywheel 14c whereby the kinetic energy of flywheel 14c is immediately utilized to bring auxiliary engine 12c up to a predetermined speed. When a predetermined magnitude of vacuum pressure obtained in the auxiliary engine upon bringing it up to speed is sensed by valve 184c, the throttle valve, not shown, of carburetor 192c is opened through the cooperation of valve 184c and vacuum slave valve 186c as described previously. With ignition 310 maintained in an "on" condition, the admission of the fuel/air mixture into the auxiliary engine upon opening the throttle valve, fires the auxiliary engine. Consequently, power is transmitted to transmission 18c by both the auxiliary engine 12c and primary engine 10c.

When additional power is no longer needed, foot pedal 160c is relieved and actuating element 205c returns switch 201c to its normally open position. Opening switch 201c deenergizes solenoid 308 enabling valve 304 to spring return and exhaust air from clutch 17c thereby decoupling auxiliary engine 12c from primary engine 10c and flywheel 14c. Opening switch 201c also shifts valve 184c cutting off the vacuum to slave valve 186c whereby valve 186c closes the throttle valve of carburetor 192c and shuts down auxiliary engine 12c.

When stopping, foot pedal 160c is further relieved whereby actuating element 203c returns switch 199c to its normally open position. Opening switch 199c de-energizes solenoid 306 enabling valve 302 to spring return and exhaust air from clutch 16c thereby decoupling flywheel 14c from the primary engine. In this manner the primary engine can be used for braking. When power is required switch 199c is closed by element 203c which in turn shifts valve 302 to actuate clutch 16c and couple the flywheel to the primary engine. Thus, the energy stored in the flywheel is used to assist in bringing the primary engine to operating speed.

It will be appreciated that auxiliary engine 12c and primary engine 10c are not limited to any particular type of engine and that the concepts, constructions, and operations described herein are applicable to all combustion type engines as well as electric engines. Further, auxiliary engine 12c, as are the auxiliary engines of the other embodiments disclosed herein, is operated at stoichiometric or above thus providing the most efficient, economical and pollution-free operation.

A further feature of the present invention illustrated with respect to this embodiment provides for reduced loading on the primary engine during its restart when assisted by the kinetic energy storing device, i.e. the flywheel. It will be appreciated that certain vehicle accessories such as the power steering pump and others normally impose a significant power load on the primary engine upon restarting it with the kinetic energy assist from the flywheel. To reduce such load, these accessories are electrically connected through a time delay switch to the switch which actuates clutch 16c coupling the primary engine to the flywheel. Consequently, when this clutch is deactivated, power to the accessories is cut off and only after a predetermined time delay and after the clutch actuating switch is energized is power for the accessories restored.

More specifically and referring to FIG. 9, each accessory 320 is operated through an electric clutching arrangement 322, one such clutching arrangement and accessory being illustrated. Power for the electric clutch is supplied via line 324 including a time delay switch 326 and a normally open accessory on-off switch 328. Line 324 is electrically connected to switch 199c. Time delay switch 326 is of known construction and enables a power connection via line 324 to the clutch 322 and accessory 326 only after a predetermined time delay, for example 5-10 seconds.

In use, the accessory switch 328 is first closed. If switch 199c is also closed, electric accessory clutch 322 is actuated only after the time delay of switch 326 is exceeded. Upon actuation of clutch 322, the accessory 320 is clutched to its source of power, usually a shaft driven by belts from the primary engine. Should the primary engine be stopped by release of the foot pedal, switch 199c is also opened by switch actuating element 203c enabling the flywheel to be declutched from the primary engine. Simultaneously power is cut off from line 324 and the clutch is deactuated to disconnect the accessory from its source of power.

When the primary engine is restarted by depressing foot pedal 160c resulting in closing switch 199c and consequent clutching of the flywheel to the primary engine to assist its restart, time delay switch 326 prevents actuation of clutch 322 for the period of the time delay. This prevents accessory 320 from imposing a load on the primary engine until after the predetermined time delay has expired and until the primary engine has restarted and is up to speed. Thereafter, time delay switch 326 enables energization of electric clutch 322 which, in turn, clutches accessory 320 to its power souce. This feature also permits use of a smaller flywheel than otherwise necessary if accessories imposed a continuous load on the primary engine.

Referring now to FIG. 10, there is illustrated a further embodiment of the modular engine assembly of the present invention. This embodiment is similar to the embodiment illustrated in FIG. 5 except for utilization of a pair of air actuated clutches for coupling and decoupling the flywheel to the primary engine and auxiliary engine, respectively, the continuously "on" ignition system described with respect to the embodiment illustrated in FIG. 9, an additional feature in which exhaust air from the clutches, upon deceleration, is transmitted into the engine exhaust stream to improve the burning of hydrocarbons, and novel and improved structure for operating an air conditioner from the auxiliary engine, all as described in detail below.

Specifically, in this embodiment, like parts of the modular engine assembly as described and illustrated in FIGS. 5 and 6 hereof are designated in FIG. 10 with like reference numerals followed by the letter suffix d. As illustrated in FIG. 10, the kinetic energy storing means, i.e. the flywheel 14d, is disposed between the primary engine 10d and auxiliary engine 12d, and, as in prior embodiments, one or both of the engines drives transmission 18d. Flywheel 14d is coupled and decoupled to and from primary engine 10d by an air actuated clutch 16d while the auxiliary engine 12d is coupled and decoupled to flywheel 14d by an air actuated clutch 17d. These clutches may be of the type manufactured by Eaton under the trade name of "Airflex". Generally, these clutches include friction shoes which move radially in and out to engage and disengage a drum, the drums for clutches 16d and 17d being illustrated at 330 and 332, respectively, and being carried by the shafts of the associated engines. Annular inflatable bladders schematically illustrated at 334 and 346 in clutches 16d and 17d, respectively, lie behind the shoes and expand under applied air pressure causing the shoes to move radially inwardly to engage the drums thereby coupling the clutches to the drums. To release each clutch, air is exhausted from its inflatable bladder and its shoes move radially outwardly to disengage from the associated drum.

Air is supplied each of bladders 334 and 336 through valves 302d and 304d respectively. Valves 302d and 304d are actuated by solenoids 306d and 308d, respectively. These valves are connected to a source of air under pressure, not shown. As in the prior embodiment, solenoids 306d and 308d are electrically coupled to clutch switches 199d and 201d. Also, as in the prior embodiment, the ignition 183d for the auxiliary engine 12d is maintained in an "on" condition during operation of the modular engine assembly.

In operating the embodiment of the modular engine assembly illustrated in FIG. 10, primary engine 10d is operated in a conventional manner. Depression of foot pedal 160d closes clutch switch 199d by means of the mechanical switch actuating element 203d on carburetor linkage 158d. Closing switch 199d energizes solenoid 306d to shift valve 302d to supply air to bladder 334 whereby the shoes of clutch 16d engage drum 330 to couple flywheel 14d to the primary engine 10d. When additional power is needed, foot pedal 160d is further depressed and mechanical switch actuating element 250d closes normally open switch 201d. Closing switch 201d energizes solenoid 308d to shift valve 304d to supply air to the bladder 336 of clutch 17d thereby engaging the shoes of that clutch against drum 332 and clutching flywheel 14d to the auxiliary engine 12d. Thus, the kinetic energy of flywheel 14d is immediately utilized to bring auxiliary engine 12d up to a predetermined speed. When a predetermined magnitude of vacuum pressure obtained in the auxiliary engine 12d upon bringing it up to speed is sensed by valve 184d, the throttle valve, not shown, of carburetor 192d is opened by the cooperation of valve 184d and vacuum slave valve 186d as described previously. Consequently, with ignition 183d continuously "on", auxiliary engine 12d fires and power is transmitted to transmission 18d by both auxiliary engine 12d and primary engine 10d through flywheel 14d. When additional power is no longer needed, this sequence is reversed. Particularly, by relieving foot pedal 160d, actuating element 205d returns switch 201d to its normally open position. Opening switch 201d de-energizes solenoid 308d enabling valve 304d to spring return and exhaust air from clutch 17d thereby decoupling auxiliary engine 12d from primary engine 10d and flywheel 14d. Opening switch 201d also shifts valve 184d cutting off the vacuum to slave valve 186d whereby valve 186d closes the throttle valve of carburetor 192d and shuts down the auxiliary engine 12. It will be appreciated that the primary engine 10d of this embodiment can be restarted with kinetic energy assist similarly as described previously with respect to the embodiment illustrated in FIG. 9.

It is a feature of this aspect of the invention that air exhausting from clutches 16d and 17d upon declutching the respective engines from the flywheel is transmitted into the exhaust stream of the engine being declutched to assist in burning excess hydrocarbons thereby reducing pollutants. To achieve this, the exhaust side of both valves 302d and 304d are connected via a conduit 340 with the exhaust stream from the engines. This air is injected into the exhaust stream ahead of the catalytic converter 342 whereby hydrocarbons, which appear in great quantities upon deceleration, are burned. It will be appreciated that each engine may have its separate exhaust system. In that event, the valve operating the clutch associated with that engine has its exhaust in communication with the exhaust for that particular engine. Thus, the charge of air exhausted from the clutch will exhaust into the exhaust system of the associated engine achieving increased burning of excess hydrocarbons at the same time deceleration causes such excess hydrocarbons to appear in the exhaust of that engine. Of course, where a single exhaust is used for both engines as illustrated, the charge of air from the respective clutches communicates with the common exhaust stream.

It will be appreciated that the injection of exhaust air from the clutches 16d and 17d into the exhaust stream of the engine or engines is also applicable to the modular engine arrangement of the embodiment illustrated in FIG. 9.

Another aspect of the present invention illustrated in FIG. 10 provides for operation of the vehicle air conditioner solely from the auxiliary engine. This type of operation is particularly useful and preferred in those vehicles, for example police cars and taxi cabs, which are stationary a good deal of the time. By operating the air conditioner solely from the auxiliary engine, low fuel consumption and low emissions are ensured since the auxiliary engine operates at stoichiometric or above.

To achieve this, the automobile air conditioner 350 is electrically connected via lines 352 and 354 to line 196d. Line 352 is in turn connected by line 356 to line 189d. A normally open double pole switch 358 is disposed in lines 354 and 356 for turning the air conditioner on and off. A line 360 connects line 352 with a solenoid 362 forming part of the carburetor 192d. When solenoid 362 is actuated, it maintains the throttle plate, not shown, in carburetor 192d in an open condition for running auxiliary engine 12d at a low or idle speed. Otherwise, the throttle plate is operated under the control of vacuum slave valve 186d.

In operation, the auxiliary and primary engines are operated as previously described. To turn on the air conditioner, switch 358 is closed thereby energizing the clutch, not shown, for the air conditioner 350. By closing switch 358, solenoid 308d of valve 304d is energized via lines 196d, 354, 356, and 189d to shift valve 304d thereby to admit air under pressure to clutch 17d and clutch the auxiliary engine 12d and flywheel 14d one to the other. Closing switch 358 also energizes solenoid 362 of carburetor 192 via lines 196d, 354, and 369. Thus, carburetor 192d opens and, since ignition 183d is "on", auxiliary engine 12d fires with the kinetic energy assist from the flywheel clutched thereto. In this manner, when the vehicle is stopped with the primary engine off, the air conditioner is driven by the auxiliary engine. Simultaneously the flywheel is maintained rotating to provide kinetic energy starting assist to the primary engine. It is significant, however, that the air conditioner is driven under these conditions by the auxiliary engine which is substantially pollution free. Also, when the vehicle is operating using the primary engine, turning the air conditioner on causes the vehicle to operate using both engines simultaneously. Thus, under the additional load imposed by the air conditioner, the auxiliary engine, which has low emissions and low pollutants, assists to carry that load.

The invention may be embodied in other specific forms without departing from the spirit or essential characteristcs thereof. The present embodiments are therefore to be considered in all respects as illustrated and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A modular engine assembly for connection with a transmission driven thereby comprising:
   a primary engine,
   means for starting said primary engine,
   an auxiliary engine disposed in tandem with said primary engine,
   means adjacent the end of said primary engine remote from said auxiliary engine for connecting said primary engine to the transmission for driving the latter by said primary engine,
   means for selectively coupling and decoupling said auxiliary engine and said primary engine one to the other for driving the transmission selectively by said primary engine or both said primary engine and said auxiliary engine, and
   means for starting said auxiliary engine including means for storing kinetic energy developed by said primary engine and applying said kinetic energy to said auxiliary engine to assist in starting said auxiliary engine, said kinetic energy storing and applying means being located adjacent the end of said primary engine remote from said auxiliary engine.

2. An assembly according to claim 1 wherein said kinetic energy storing and applying means comprises a rotatable mass driven by said primary engine.

3. An assembly according to claim 2 wherein said coupling and decoupling means includes a clutch disposed between said primary engine and said auxiliary engine, and means for actuating said clutch.

4. An assembly according to claim 3 wherein said auxiliary engine drives the transmission through said driven mass and said primary engine when said clutch is actuated.

5. An assembly according to claim 2 wherein said starting means for said auxiliary engine includes a first clutch for drivingly engaging said rotatable mass and said primary engine one to the other and a second clutch for drivingly engaging said auxiliary engine and said primary engine one to the other, said second clutch forming at least part of said coupling and decoupling means, and means for selectively actuating said first clutch to drivingly engage said rotatable mass and said primary engine and said second clutch to drivingly engage said auxiliary engine and said primary engine.

6. An assembly according to claim 5 wherein said kinetic energy storing and applying means comprises a flywheel.

7. An assembly according to claim 1 including means for transferring heat from said primary engine to said auxiliary engine thereby to maintain said auxiliary engine in a ready condition.

8. An assembly according to claim 1 wherein said kinetic energy storing and applying means is adapted to bring said auxiliary engine up to a predetermined speed, means for supplying fuel to said auxiliary engine, and means coupled to said fuel supply means and said auxiliary engine for initiating flow of fuel to said auxiliary engine when said auxiliary engine obtains said predetermined speed.

9. An assembly according to claim 8 wherein said kinetic energy storing and applying means comprises a rotatable mass.

10. An assembly according to claim 1 wherein said kinetic energy storing and applying means comprises a rotatable mass in tandem with said primary engine and said auxiliary engine.

11. An assembly according to claim 10 wherein said starting means for said auxiliary engine includes a first clutch for drivingly engaging said rotatable mass and said primary engine one to the other and a second clutch for drivingly engaging said auxiliary engine and said primary engine one to the other, said second clutch forming at least part of said coupling and decoupling means, and means for selectively actuating said first clutch to drivingly engage said rotatable mass and said primary engine and said second clutch to drivingly engage said auxiliary engine and said primary engine.

12. An assembly according to claim 1 including a vehicle accessory, means connecting said accessory and said primary engine one to the other for the normally driving said accessory from said primary engine, said accessory normally imposing a load on said primary engine, means for coupling and decoupling said kinetic energy storing means and said primary engine, means connected to the latter coupling and decoupling means for disabling said accessory from driving connection with said primary engine when said kinetic energy storing means is decoupled from said primary engine.

13. An assembly according to claim 12 including means forming part of the latter coupling and decoupling means for enabling driving connection betweeen said accessory and said primary engine upon expiration of a predetermined time delay after said primary engine and said kinetic energy storing means are coupled one to the other whereby the load of the accessory is imposed on said primary engine only after the latter has restarted and obtained operating speed.

14. An engine assembly for connection with a transmission driven thereby comprising:
an engine,
means for connecting said engine to the transmission for driving the latter by said engine,
means for starting said engine including means for storing kinetic energy developed by said engine when started, said kinetic energy storing means being located between said engine and the transmission,
means for selectively coupling and decoupling said engine and said kinetic energy storing means one to the other, and
means for controlling said coupling and decoupling means whereby said engine may be decoupled from said kinetic energy storing means and stopped during low power requirements and coupled to said kinetic energy storing means to apply kinetic energy stored thereby to said engine and assist in starting said engine.

15. An engine assembly according to claim 14 wherein said kinetic energy storing means comprises a flywheel.

16. An engine assembly according to claim 14 wherein said control means includes a control member movable between two positions, said member in one position being operable to decouple said engine and said kinetic energy storing means, said member in the other position being operable to couple said engine and said kinetic energy storing means.

17. An engine assembly according to claim 16 in combination with said transmission.

18. An engine assembly according to claim 14 wherein said kinetic energy storing means includes a rotatable mass, said engine having an output shaft, said coupling and decoupling means including a clutch for coupling and decoupling said shaft and said mass one to the other.

19. A modular engine assembly for connection with a transmission driven thereby comprising:
a primary engine,
means for starting said primary engine,
means for connecting said primary engine to the transmission for driving the latter by said primary engine,
an auxiliary engine,
means for selectively coupling and decoupling said auxiliary engine and the transmission one to the other for driving the transmission selectively by said primary engine or both said primary engine and said auxiliary engine, and
means for starting said auxiliary engine including means for storing kinetic energy developed by said primary engine and applying said kinetic energy to said auxiliary engine to assist in starting said auxiliary engine.

20. An assembly according to claim 19 wherein said storing and applying means comprises a rotatable mass.

21. An assembly according to claim 20 wherein said starting means includes a first clutch for drivingly engaging said rotatable mass and said primary engine and a second clutch for drivingly engaging said rotatable mass and said auxiliary engine, and means for selectively actuating said first clutch to drivingly engage said rotatable mass and said primary engine and said second clutch to drivingly engage said rotatable mass and said auxiliary engine.

22. An assembly according to claim 19 including means for transferring heat from said primary engine to said auxiliary engine thereby to maintain said auxiliary engine in a ready condition.

23. An assembly according to claim 19 including means for circulating cooling fluid between said primary engine and said auxiliary engine whereby said auxiliary engine serves as a heat sink for the primary engine.

24. An assembly according to claim 23 including a fan for cooling at least one of said engines, and means sensitive to the operating temperature of one of said engines for actuating said fan in response to sensing an engine temperature above a predetermined temperature.

25. An assembly according to claim 21 including a vehicle accessory, means connecting said accessory and said primary engine one to the other for normally driving said accessory from said primary engine, said accessory normally imposing a load on said primary engine, means for coupling and decoupling said kinetic energy storing means and said primary engine, means connected to the latter coupling and decoupling means for disabling said accessory from driving connection with said primary engine when said kinetic energy storing means is decoupled from said primary engine.

26. An assembly according to claim 25 including means forming part of the latter coupling and decoupling means for enabling driving connection between said accessory and said primary engine upon expiration of a predetermined time delay after said primary engine and said kinetic energy storing means are coupled one to the other whereby the load of the accessory is imposed on said primary engine only after the latter has restarted and obtained operating speed.

27. An assembly according to claim 21 including a vehicle air conditioner, means operably connecting said air conditioner and said auxiliary engine one to the other for driving said air conditioner from said auxiliary engine.

28. An assembly according to claim 27 including a carburetor for said auxiliary engine, means for opening said carburetor, switch means connected to said carburetor opening means, said air conditioner, and said second clutch actuating means whereupon closing said switch means opens said carburetor to fire said auxiliary engine and actuates said second clutch to drivingly engage said rotatable mass and said auxiliary engine.

29. An assembly according to claim 21 wherein one of said first and second clutches comprises an air actuated clutch, an exhaust for the engine associated with the one air actuated clutch, means connecting said one air actuated clutch and said exhaust one to the other for transmitting air exhausted from said one air actuated clutch into the exhaust of the associated engine.

30. An assembly according to claim 21 wherein each said first clutch and said second clutch is air actuated, said assembly including an exhaust for said engines, and means connecting said air actuated clutches and said exhaust for transmitting air exhausted vrom said clutches into said exhaust.

31. A modular engine assembly for connection with a transmission driven thereby comprising:
a primary engine,
means for starting said primary engine,
means for connecting said primary engine and the transmission one to the other for driving the transmission by said primary engine,
an auxiliary engine,
means for selectively coupling and decoupling said auxiliary engine and said primary engine one to the other for driving the transmission selectively by said primary engine or both said primary engine and said auxiliary engine, and
means for starting said auxiliary engine including means for storing kinetic energy developed by said primary engine and applying said kinetic energy to said auxiliary engine to assist in starting said auxiliary engine, said kinetic energy storing means comprising a rotatable mass,
a first clutch for coupling and decoupling said rotating mass and said primary engine one to the other, said coupling and decoupling means including a second clutch for coupling said primary engine and said auxiliary engine one to the other, one of said first and second clutches comprising an air actuated clutch 32. An assembly according to claim 31 including an exhaust for the engine associated with the one air actuated clutch, means connecting said one air actuated clutch and said exhaust one to the other for transmitting air exhausted from said one air actuated clutch into the exhaust of the associated engine.

33. An assembly according to claim 31 wherein each said first clutch and said second clutch is air actuated, said assembly including an exhaust for said engines, and means connecting said air actuated clutches and said exhaust for transmitting air exhausted from said clutches into said exhaust.

* * * * *